J. A. SCHAEFER.
SPEED AND CIRCUIT CONTROLLING APPARATUS FOR ELECTRIC MOTORS.
APPLICATION FILED AUG. 24, 1907.
959,887.
Patented May 31, 1910.
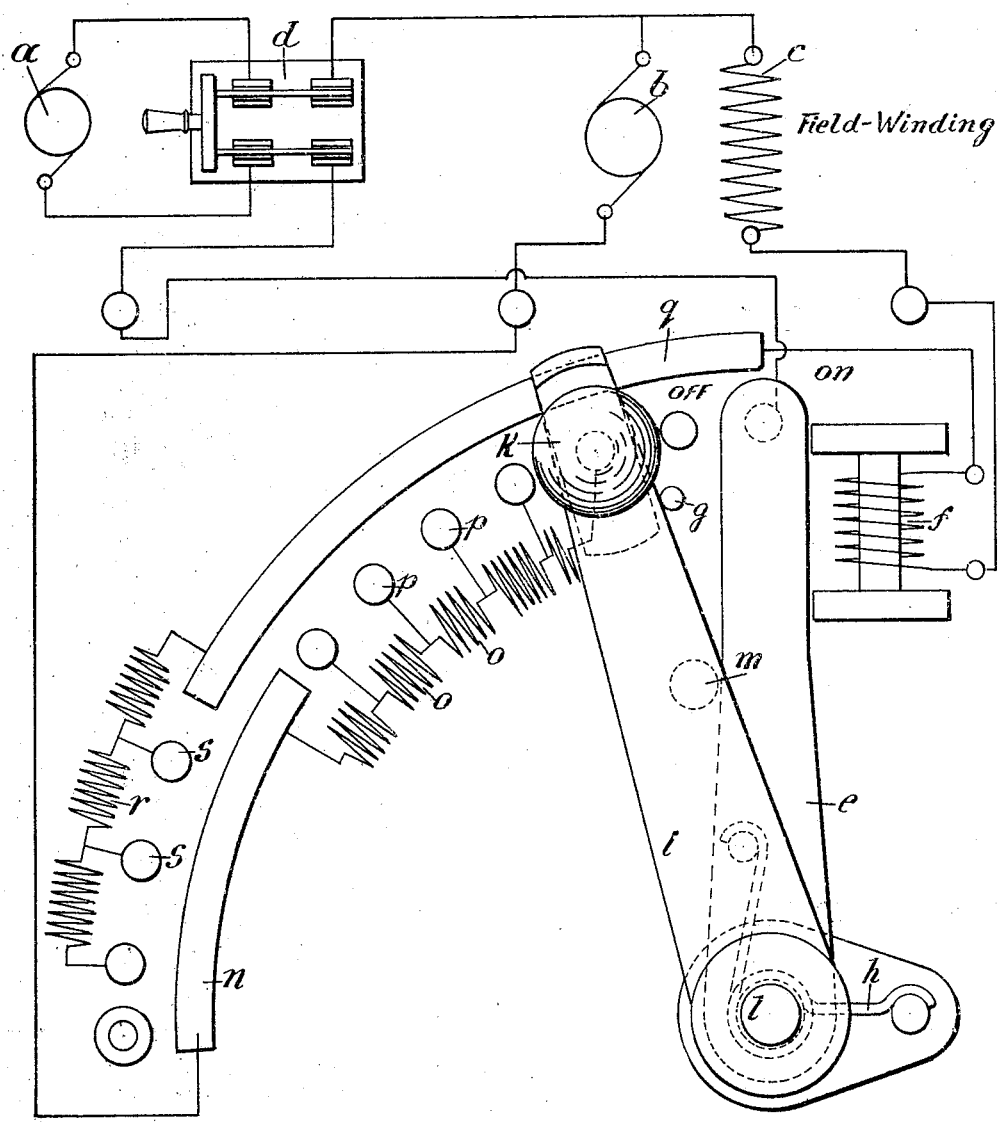
WITNESSES:
Otto Rothenstein
S. E. Anderson
INVENTOR
Jos. A. Schaefer
BY G. L. Cragg
ATTORNEY

UNITED STATES PATENT OFFICE.

JOSEPH A. SCHAEFER, OF CHICAGO, ILLINOIS, ASSIGNOR TO JOHN SCHAEFER, OF CHICAGO, ILLINOIS.

SPEED AND CIRCUIT CONTROLLING APPARATUS FOR ELECTRIC MOTORS.

959,887.     Specification of Letters Patent.     Patented May 31, 1910.

Application filed August 24, 1907. Serial No. 389,984.

*To all whom it may concern:*

Be it known that I, JOSEPH A. SCHAEFER, citizen of the United States, residing at Chicago, in the county of Cook and State of Illinois, have invented a certain new and useful Improvement in Speed and Circuit Controlling Apparatus for Electric Motors, of which the following is a full, clear, concise, and exact description, reference being had to the accompanying drawings, forming a part of this specification.

My invention relates to speed and circuit controlling apparatus for electric motors, and has for its main object the provision of two switching devices, one of which is adapted to cause the motor to operate at different speeds, while the other is a main switch serving to throw the motor into and out of the operating circuit, and which I will hereinafter term the main switch. It is a feature of my invention to provide electro-magnetic means for retaining the main switch in a closed position, which electro-magnetic means will perform its function so long as there is sufficient current in the associate circuit, means being further provided for moving the main switch to an open position when the electro-magnetic means loosens its hold thereon. In accordance with my invention, the mechanical inter-relation between the speed regulating and main circuit switches is one whereby the regulating switch will force the main switch to a closed position and thereby into a position to enable it to be held by the electro-magnet which is preferably included serially in the field circuit. After the speed regulating switch has caused the closure of the main switch and placed it within the range of the electro-magnet, the said speed regulating switch may be moved to any of its various positions without modifying the position of the main switch. The entire organization is preferably such that the speed of the motor is increased as the speed regulating switch is moved away from the main switch, the closure of the main switch itself desirably starting the motor at its lowest speed.

I will explain my invention more fully by reference to the accompanying drawing, illustrating diagrammatically the preferred embodiment thereof.

I have indicated a generator $a$ of suitable current, which supplies current to the armature $b$ and field winding $c$ of an electric motor, a knife switch $d$ being shown for throwing the motor and my improved apparatus to be described into and out of circuit relation with the generator.

What I have termed the "main switch" is shown at $e$ and has two alternative positions. In the position shown, the "on" position, the switch is in action to close the motor circuit to enable the motor to start at its lowest speed, the winding of the electro-magnet $f$ being included in the motor circuit closed by the main switch, so that said main switch will be held by the electro-magnet, at least that part of the main switch opposing the poles of the electro-magnet possessing sufficient iron (in the preferred embodiment) to enable the magnet to hold the switch. When the main switch occupies its alternative or "off" position it rests against the stop $g$. The switch is brought to this position, when it is released by the electro-magnet $f$ by the action of the spring $h$ provided solely for this purpose. The circuit closed by the main switch constantly includes the switch $i$ provided with a suitable operating handle $k$ and preferably mounted upon the same shaft $l$ on which the switch $e$ turns, and which shaft electrically connects the switches $e$ and $i$. The spring $h$, however, has no effect upon the switch $i$ except ineffectually to oppose the movement of the switch to the initial motor speed position, when it engages the switch $e$ to move it to the position shown, a lug $m$ being provided upon switch $i$ to enable said switch to actuate the main switch $e$. Thus the switch $i$ constitutes a speed regulating switch which may remain in its various speed regulating positions independently of the main switch.

In the embodiment of the invention shown, the armature $b$ is in shunt relation to field winding $c$. The armature circuit may be traced from the direct connection of the upper armature brush through the armature and its brushes, the contact sector $n$, one or more of the sections $o$ of a rheostat resistance, to one of the buttons $p$ that happens to be in engagement with the speed regulating switch $i$, the switch $i$, to the main switch $e$, to line. When the speed regulating switch $i$ is nearest the main switch $e$, all of the resistance sections $o$ are in circuit with the armature and the motor then runs at its slowest speed. As the switch *i* is moved away from the switch *e*, resistance sections are cut out of circuit with the armature and the speed of the motor is correspondingly increased. When the resistance sections *o* have all been cut out, the motor has been brought to normal speed. In order that the speed may be brought above normal, I provide the sections *r*, of a field rheostat, that are brought into series with the field winding, one after the other, as the switch *i* is continued in its movement away from the switch *e* to correspondingly weaken the field of the field winding and further increase the speed of the motor. It will be observed that the rheostat sections *r* are in series with the sector *q* and that the amount of resistance *r* is dependent upon which button *s* is engaged by the switch *i*, the sector *n* being adapted for engagement throughout its length with the switch *i*. The sectors *q* and *n* overlap slightly, so that the switch *i* may simultaneously be in engagement with the same, in which position of the switch *i* all resistance *o* and *r* is out of circuit, and the motor is running at normal speed.

It is obvious that changes may readily be made in the embodiment of my invention herein shown and particularly described, without departing from the spirit thereof, and I do not, therefore, wish to be limited to the precise construction shown, but,

Having thus described my invention, I claim as new and desire to secure by Letters-Patent the following—

1. A speed regulating and circuit controlling mechanism for electric motors including a main switch, a speed regulating switch serving to variably regulate both the armature and field circuits of the motor and adapted to remain in various speed regulating positions independently of the main switch, the speed-regulating mechanism including resistance sections *o* having terminal buttons *p*, a sector or bar *n* in serial relation with the resistance sections *o* and the armature, resistance sections *r* having terminal buttons *s*, and a sector or bar *q* in serial relation with the resistance sections *r* and the field of the motor, the sector *n* being located opposite the buttons *s* and being so located with respect to said buttons that the switch may simultaneously engage a button *s* and said sector, while the sector *q* is located opposite the buttons *p* and is so located with respect to the buttons *p* that the switch may simultaneously engage a button *p* and said sector, the speed regulating switch in being moved to its initial position engaging the main switch to move it from its "off" position to its "on" position, an electro-magnetic retaining device for holding the main switch in its "on" position whose circuit is closed upon the operation of the switching mechanism that brings the main switch to its "on" position, and means for removing the main switch from its "on" position to its "off" position when said electro-magnetic mechanism ceases its hold upon the main switch.

2. A speed regulating and circuit controlling mechanism for electric motors including a main switch, a speed regulating switch serving to variably regulate both the armature and field circuits of the motor and adapted to remain in various speed regulating positions independently of the main switch, the speed-regulating mechanism including resistance sections *o* having terminal buttons *p*, a sector or bar *n* in serial relation with the resistance sections *o* and the armature, resistance sections *r* having terminal buttons *s*, and a sector or bar *q* in serial relation with the resistance sections *r* and the field of the motor, the sector *n* being located opposite the buttons *s* and being so located with respect to said buttons that the switch may simultaneously engage a button *s* and said sector, while the sector *q* is located opposite the buttons *p* and is so located with respect to the buttons *p* that the switch may simultaneously engage a button *p* and said sector, the speed regulating switch in being moved to its initial position engaging the main switch to move it from its "off" position to its "on" position, an electro-magnetic retaining device for holding the main switch in its "on" position whose winding is included in circuit with the motor and is consequently energized upon the operation of the switching mechanism that brings the main switch to its "on" position, and means for removing the main switch from its "on" position to its "off" position when said electro-magnetic mechanism ceases its hold upon the main switch.

In witness whereof, I hereunto subscribe my name this 19th day of August A. D., 1907.

JOSEPH A. SCHAEFER.

Witnesses:
L. G. STROH,
C. H. SMOOT.